United States Patent [19]

Veltman et al.

[11] Patent Number: 5,685,216
[45] Date of Patent: Nov. 11, 1997

[54] CONTINUOUS VESSEL DEFLECTION MONITOR DEVICE

[75] Inventors: Joost Veltman, Aptos; Andrew Carl Prins; Scott R. Cavanaugh, both of Madera, all of Calif.

[73] Assignee: FMC Corporation, Chicago, Ill.

[21] Appl. No.: 505,138

[22] Filed: Jul. 21, 1995

[51] Int. Cl.$^6$ ................................................ A23L 3/06
[52] U.S. Cl. ........................ 99/361; 99/359; 99/367; 99/370; 99/371
[58] Field of Search ................. 99/359–371, 330, 99/477–479, 483; 422/26, 38, 307–309, 292, 302–304; 134/134; 426/521–523

[56] References Cited

U.S. PATENT DOCUMENTS

| | | | |
|---|---|---|---|
| 5,215,002 | 6/1993 | Veltman | 99/361 |
| 5,245,916 | 9/1993 | Elizondo et al. | 99/365 X |
| 5,259,301 | 11/1993 | Veltman | 99/365 |
| 5,358,030 | 10/1994 | Veltman et al. | 99/468 X |
| 5,456,092 | 10/1995 | Veltman et al. | 62/381 |
| 5,458,261 | 10/1995 | Veltman | 221/150 A |
| 5,472,042 | 12/1995 | Veltman et al. | 99/470 X |
| 5,533,438 | 7/1996 | Veltman | 99/360 |
| 5,535,916 | 7/1996 | Veltman | 99/366 X |

Primary Examiner—Timothy F. Simone
Attorney, Agent, or Firm—Michael B. K. Lee; Douglas W. Rudy

[57] ABSTRACT

The invention provides a rotary processor which uses a linear motion detector to measure the deflection of the rotary processor as the rotary processor is heated. The linear motion detector measures the deflection of the rotary processor to prevent damage caused by excessive vessel deflection. The linear motion detector is placed to measure deflection near the center of a rotary processor.

7 Claims, 4 Drawing Sheets

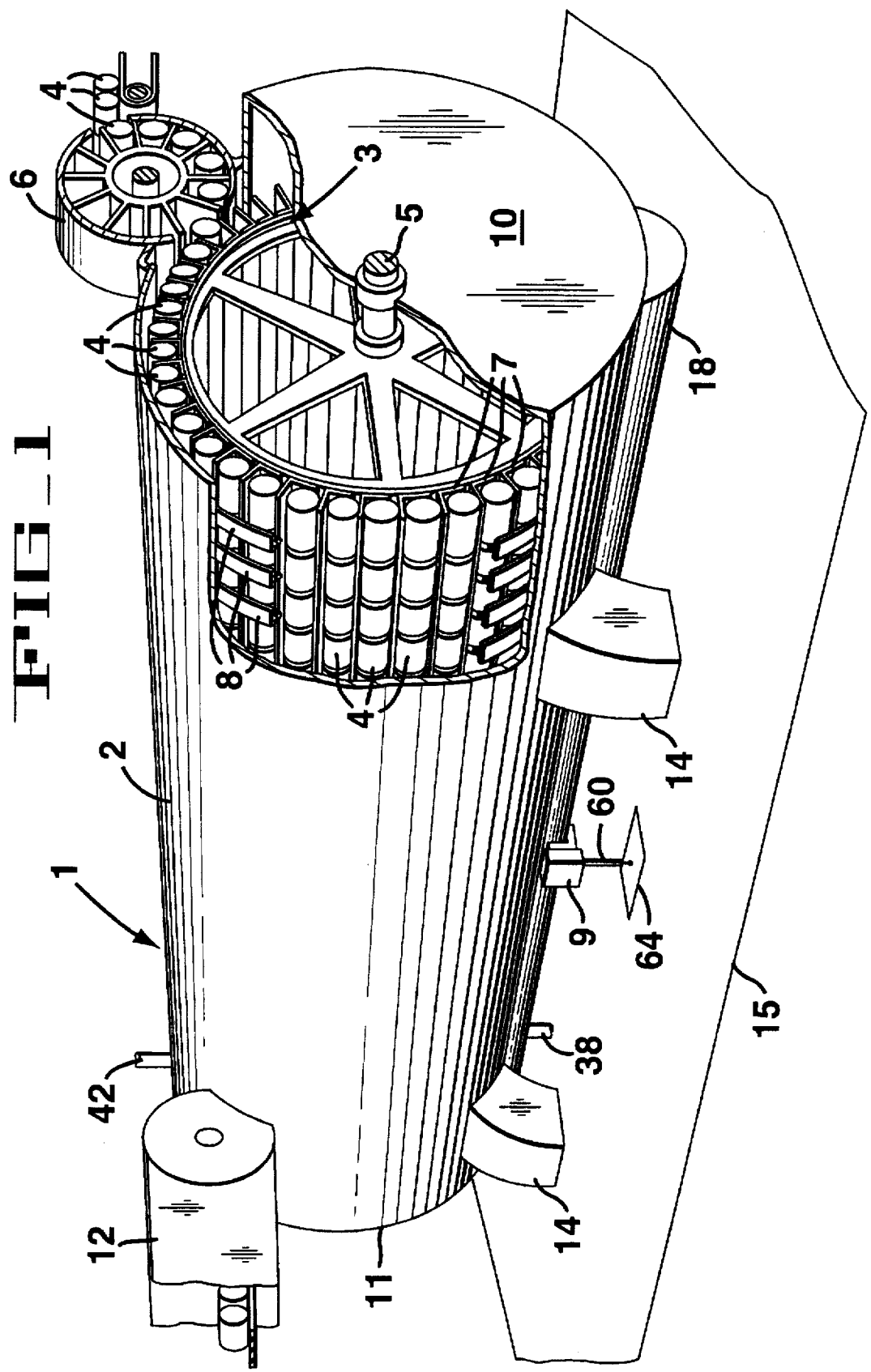

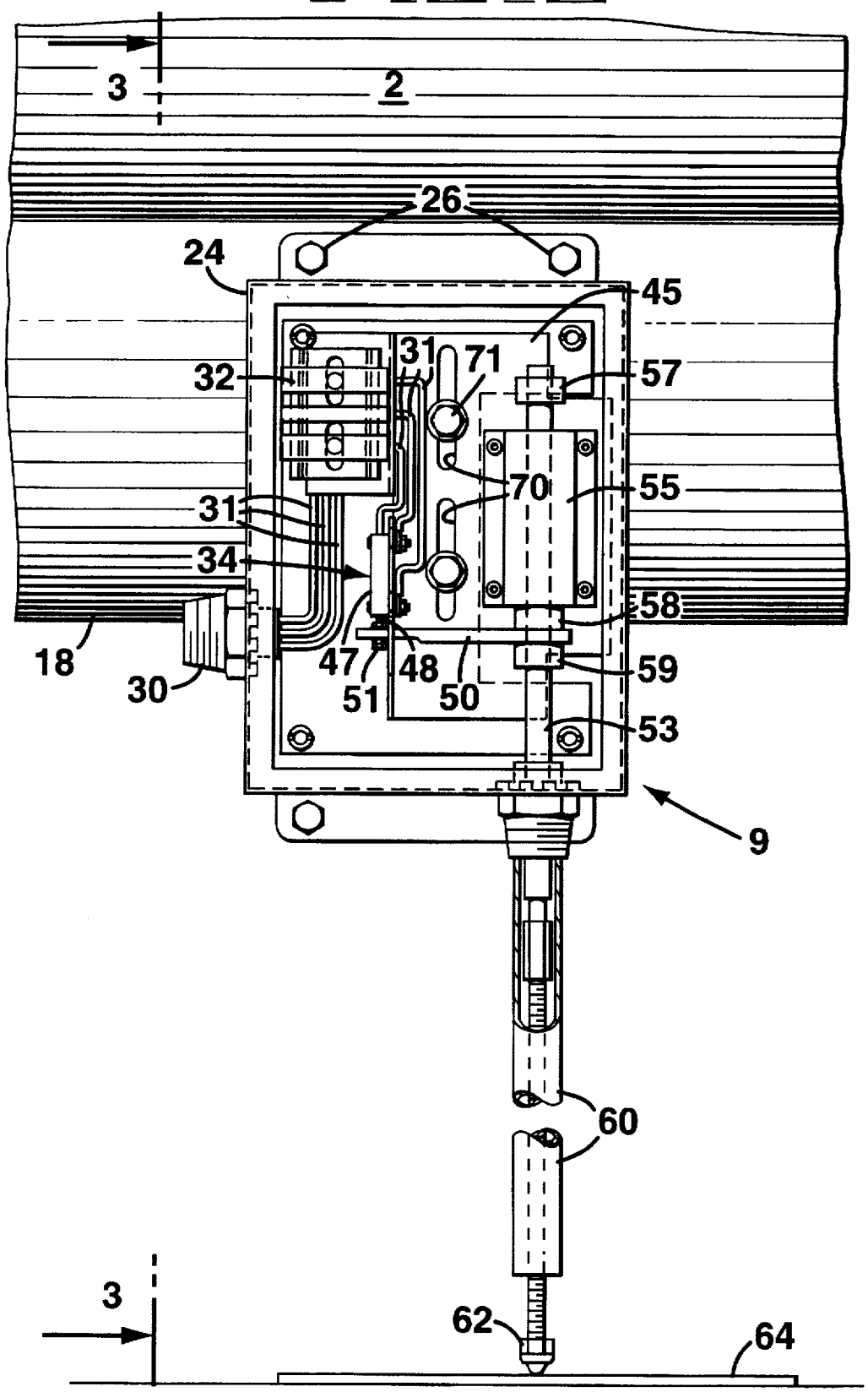

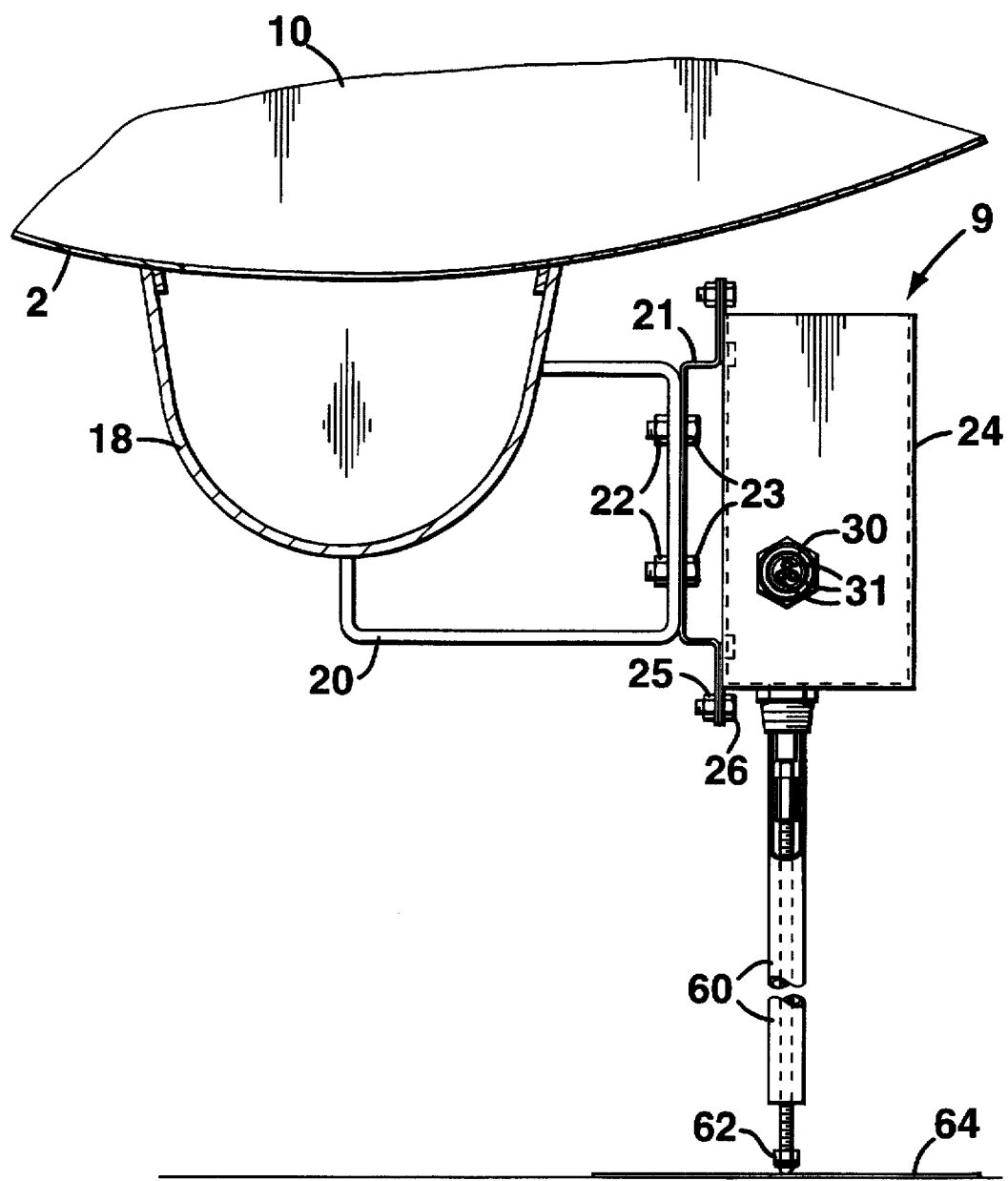

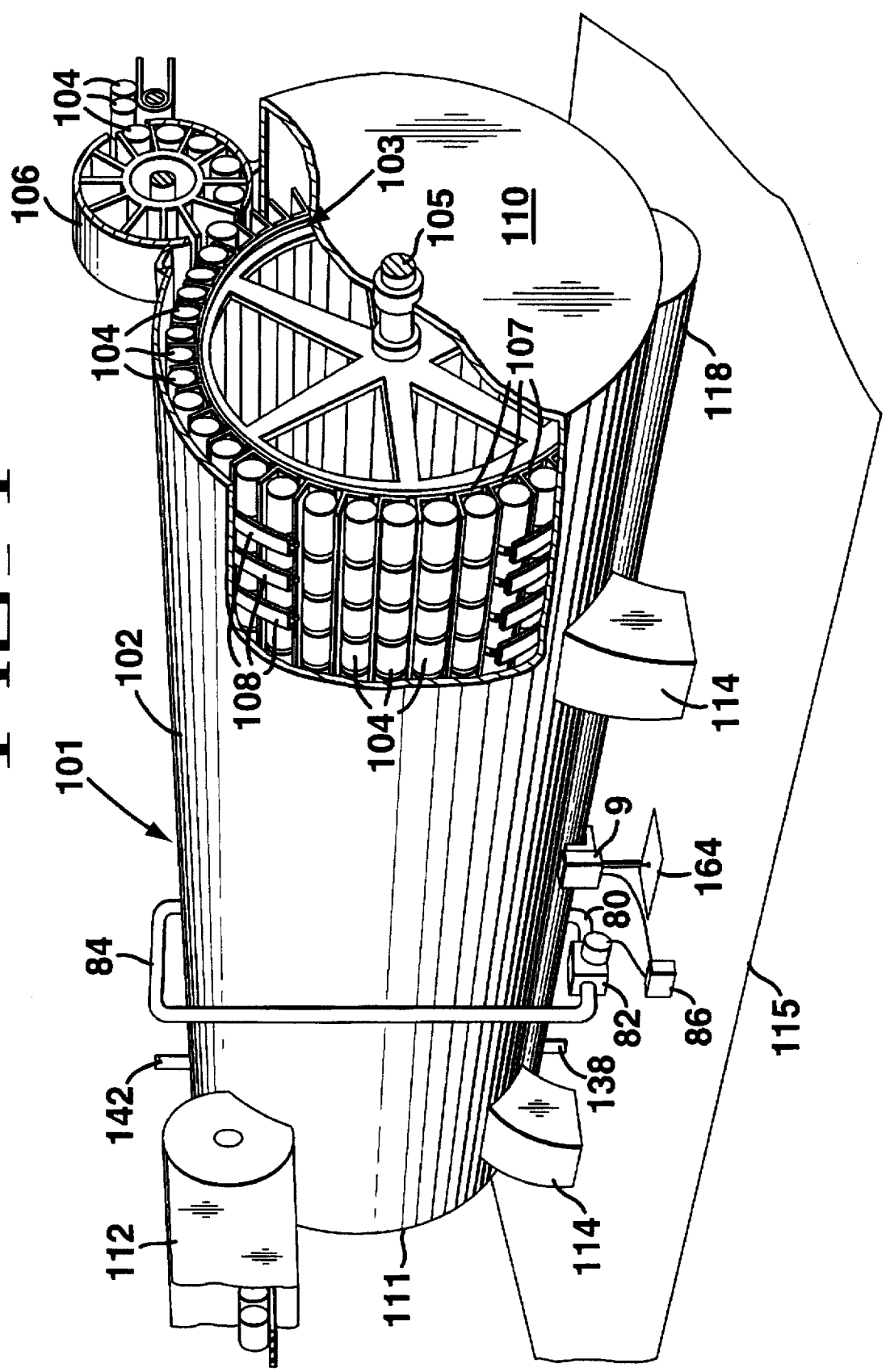

CONTINUOUS VESSEL DEFLECTION MONITOR DEVICE

BACKGROUND OF THE INVENTION

The invention relates to a method and apparatus for processing filled containers, such as a sterilizer/cooker or cooler for cans of food. Continuous rotary sterilizers pressure cooker lines heat sterilize various food products. This sterilization process may use temperatures sometimes exceeding 260 degrees Fahrenheit. Sudden temperature changes, caused by process interruptions may cause extensive deflection of the vessel. For high temperature and high capacity, multiple container applications clearance between components can become very critical. Use of a rotary sterilizer subject to excessive deflection could eliminate clearance between components and thus damage the rotary sterilizer.

SUMMARY OF THE INVENTION

Then invention provides a method and apparatus for continuously monitoring the deflection in a rotary sterilizer to prevent damage caused by excessive vessel deflection. The invention uses a linear monitor to measure the deflection near the center of the vessel.

BRIEF DESCRIPTION OF THE DRAWINGS

FIG. 1 is a perspective view with parts cut away of a single vessel used for heating cans.

FIG. 2 is a cut away view of a linear monitor.

FIG. 3 is a sectional view the monitor shown in FIG. 2 along cut lines 3—3.

FIG. 4 is a perspective view with parts cut away of a single vessel used for cooling cans.

FIG. 1 is a perspective view of a single vessel 1 used for heating cans and which has the inventive monitor device. The single vessel 1 of the continuous rotary pressure sterilizer includes a cylindrical housing 2 having a rotatable reel 3 therein, which rotates around an axle 5 which is journaled in a first end plate 10 and a second end plate 11 that are secured to the housing 2 in pressure tight engagement. The cylindrical housing 2 and the end plates 10, 11 form the single vessel 1. On a first end of the vessel 1 in the region of the first end plate 10 is a feed device 6. On a second side of the vessel 1 in the region of the second end plate 11 is a discharge device 12. A plurality of angle bars 7 extend the length of the reel 3 parallel to the axis of rotation of the reel 3 on the outer circumference of the reel 3. A T-shaped rail 8 forms a spiral on the inside of the housing 2. At the bottom of the vessel 1 is a trough 18. A linear monitor 9 is mounted on the outside of the trough 18 near the center of the single vessel 1, as shown. A condensate drain 38 is located in the trough 18. A steam inlet 42 is located near the top of the vessel 1. The cylinder housing 2 rests on a plurality of legs 14, which rest on a floor 15.

FIG. 2 is a cut away view of the linear monitor 9, mounted to the trough 18. FIG. 3 is a sectional view the monitor 9 shown in FIG. 2 along cut lines 3—3, mounted on the trough 18. A trough bracket 20 is mechanically connected to the trough 18 by welding. A mounting bracket 21 is mechanically connected to the trough bracket 20 by bracket nuts 22 and bracket bolts 23. A sensor housing 24 is mechanically connected to the trough bracket 20 by housing nuts 25 and housing bolts 26. An electrical hub 30 passes through the sensor housing 24, allowing electrical wiring 31 to pass from a control box into the sensor housing 24 to a terminal block 32 within the sensor housing 24. The terminal block 32 is also electrically connected to a linear position transducer 34. Both the terminal block 32 and the linear position transducer 34 are mechanically connected to a slide plate 45, by nuts and bolts. The linear position transducer 34 comprises an transducer covering 47 mechanically, which is connected to the slide plate 45 and electrically connected to the terminal block 32, and a sliding rod 48. Within the transducer covering 47 is a variable resistor or some other means known in the art to determine the position of the sliding rod 48.

One end of the sliding rod 48 passes through an aperture in a first end of a lever 50. Rod retaining nuts 51 are threaded onto the sliding rod 48 on both sides of the lever 50 to hold the sliding rod 48 in position with respect to the lever 50. The lever 50 passes through a slot in the slide plate 45. A second end of the lever 50 also has an aperture, through which a measuring rod 53 passes. The measuring rod 53 passes through a linear bearing, 55, which prevents the measuring rod 53 from moving radial, but allows the measuring rod 53 to move axially. The linear bearing 55 is mechanically connected to the slide plate 45. A first collar 57 is placed around the measuring rod 53 at a first end of the measuring rod 53. The measuring rod 53 then passes through the linear bearing 55. A second collar 58 is placed around the measuring rod 53 on the other side of the linear bearing 55 from the first collar 57. The lever 50 is on the side of the second collar 58 opposite from the linear bearing 55. A third collar 59 is placed around the measuring rod 53 on an opposite side of the lever 50 from the second collar 58. The measuring rod 53 passes through an aperture in the sensor housing 24 and through a measuring rod conduit 60. The measuring rod 53 terminates at a cap 62. The cap 62 rests on a plate 64 which is mounted on the floor 15.

The slide plate 45 has two vertical mounting slots 70. Mounting bolts 71 pass through the mounting slots 70 and thread into the sensor housing 24. The mounting bolts 71 may be loosened to allow the sliding plate 45 to be moved up or down to allow the measuring rod 53 to be adjusted. The mounting bolts 71 may be tightened to hold the sliding plate 45 in place.

In operation of the above embodiment, when the single vessel is at a uniform temperature, the mounting bolts 71 are loosened and the slide plate 45 is moved so that the gap between the first collar 57 and the linear bearing 55 is approximately 0.30 inches. The mounting bolts 71 are then tightened. This allows the zeroing of the linear monitor 9, while the single vessel 1 is at a uniform temperature. The first collar 57 and the second collar 58 act as stops, by limiting the movement of the measuring rod 53, when the first collar 57 or as the second collar 58 contact the linear bearing 55. The second collar 58 and the third collar 59 hold the lever in place along the axial direction of the measuring rod 53. The control box is also set to zero.

When used as a sterilizer or cooker, the rotatable reel 3 is rotated and a steam valve is gradually opened, injecting steam into the single vessel 1. If the steam causes the single vessel 1 to deflect, the greatest deflection will near the center of the single vessel 1. The deflection in this case causes the center of the single vessel 1 to move downward and closer to the floor 15. This causes the sensor housing 24, the slide plate 45, and the linear bearing 55 to move closer to the floor 15, while the measuring rod 53 in contact with the plate 64 mounted on the floor 15 does not move. Therefore the sliding plate 45 moves downward with respect to the end of the lever 50 between the second collar 58 and third collar 59. The slot in the slide plate 45 through which the lever 50 passes limits the lever 50 to an axial movement, and as the slide plate 45 moves downward, the lever 50 remains stationary, causing the sliding rod 48 to remain stationary. This causes the transducer cover 47 to move downward upon the stationary sliding rod 48, sending an electrical signal through the terminal block to the control box indicating that the center of the single vessel 1 has moved downward.

Using the lever 50 to transmit the movement of the measuring rod 53 to the sliding rod 48, instead of having the sliding rod 48 directly contact the floor shields the sliding rod 48 from excessive forces, shielding the linear position transducer from damage. The first collar 57 and second collar 58 provide linear stops for the measuring rod 53, which prevents the linear position transducer 34 from being subjected to linear over travel. The prevention of radial movement of the measuring rod 53 by the linear bearing 55, also prevents damage to the linear position transducer 34. The slot in the slide plate 45 prevents the lever 50 from turning and radially loading the linear position transducer 34.

As the rotatable reel 3 is rotated and steam is added to the single vessel 1. In problem situations when the rotatable reel 3 is stopped during the process, the temperature of the vessel 1 becomes nonuniform. If the linear monitor 9 indicates a movement of the center of the single vessel 1 of more than 0.130 inches the control box provides a caution to the operator. The caution is that the operator should be on alert for any unusual sounds generated by the rotatable reel 3. The movement of the rotatable reel is restarted, with the warning that the rotatable reel 3 should be stopped if any unusual sounds are heard. If the linear monitor 9 indicates a movement of the center of the single vessel 1 of more than 0.160 inches then a special restart procedure is used to start the rotation of the rotatable reel 3. One special restart procedure requires that the reel be manually rotated a full rotation. If scrapping is not encountered during this manual rotation, the automated rotation of the rotatable reel 3 may be started. Because vessels are constructed longer or vessels are used for multiple container sizes, the tolerances between angle bars 7 and spirals 8 become more critical and a means of controlling the available clearance becomes essential. Excessive distortion in the vessel 1 could cause the rotatable reel 3 to scrape or bind against the T-shaped rail 8. This could damage either the rotatable reel 3 or the T-shaped rail 8.

Once the single vessel 1 is evenly heated the deflection is minimized. Movement of the rotatable reel 3 during the initial heating or cooling process allows for a faster temperature equalization and minimizes deflection during this process.

Once the single vessel 1 is evenly heated, cans are introduced by the feed device 6 into the single vessel 1 and between the rotatable reel 3 and the T-shaped rail 8. The rotatable reel 3 pushes the cans along the T-shaped rail causing the cans to traverse the single vessel to the discharge 12.

FIG. 4 is a perspective view of a single vessel 101 pressure cooler the inventive monitor device. The single vessel 101 of the continuous rotary pressure sterilizer includes a as cylindrical housing 102 having a rotatable reel 103 therein, which rotates around an axle 105 which is journaled in a first end plate 110 and a second end plate 111 that are secured to the housing 102 in pressure tight engagement. The cylindrical housing 102 and the end plates 110, 111 form the single vessel 101. On a first end of the vessel 101 in the region of the first end plate 110 is a feed device 106. On a second side of the s vessel 101 in the region of the second end plate 111 is a discharge device 112. A plurality of angle bars 107 extend the length of the reel 103 parallel to the axis of rotation of the reel 103 on the outer circumference of the reel 103. A T-shaped rail 108 forms a spiral on the inside of the housing 102. At the bottom of the vessel 101 is a trough 118. A linear monitor 9 is mounted on the outside of the trough 118 near the center of the single vessel 101, as shown. A drain 138 is located in the trough 118. The linear monitor 9 in this embodiment is the same as the linear monitor 9 shown in the previous embodiment. A water inlet 142 is located near the top of the vessel 101. The cylinder housing 102 rests on a plurality of legs 114, which rest on a floor 115. A cycling drain 80 is in fluid connection to the trough 118. A fluid pump 82 is in fluid connection to the cycling drain 80. A fluid return 84 is in fluid connection between the fluid pump 82 and the top of the vessel 101. The monitor 9 is electrically connected to a control box 86, which is electrically connected to the fluid pump 82.

When used as a pressure cooler, the rotatable reel 103 is rotated and water is provided to the single vessel 101 through the water inlet 142. As the heated cans pass through the cooler vessel 101, the water is heated. If a problem occurs causing the rotatable reel 103 stop, the hotter water will tend to rise and the cooler water will tend to sink causing a nonuniform temperature distribution, causing the single vessel 101 to deflect, with the greatest deflection being near the center of the single vessel 101. This temperature distribution usually causes a deflection, which causes the center of the single vessel 101 to move upward and away to the floor 115. This causes the sensor housing 24, the slide plate 45, and the linear bearing as 55 to move away from the floor 115, while the measuring rod 53 in contact with the plate 164 mounted on the floor 115 does not move. Therefore the sliding plate 45 moves upward with respect to the end of the lever 50 between the second collar 58 and third collar 59. The slot in the slide plate 45 through which the lever 50 passes limits the lever 50 to an axial movement, and as the slide plate 45 moves upward, the lever 50 remains stationary, causing the sliding rod 48 to remain stationary. This causes the transducer cover 47 to move upward upon the stationary sliding rod 48, sending an electrical signal through the terminal block to the control box 86 indicating that the center of the single vessel 101 has moved upward.

If the linear monitor 9 indicates a movement of the center of the single vessel 101 of more than 0.130 inches the control box starts the fluid pump, which draws the cooler water from the cycling drain 80 near the bottom of the single vessel 101 and provides it through the fluid return 84 to the area of the hotter water near the top of the single vessel 101. This causes a mixing of the hot and cold water providing a more uniform temperature reducing the deflection. Once the water temperature is more uniform, so that the deflection monitor measures a deflection of less than 0.130 inches, the rotatable real 103 may be restarted.

While preferred embodiments of the present invention have been shown and described herein, it will be appreciated that various changes and modifications may be made therein without departing from the spirit of the invention as defined by the scope of the appended claims.

What is claimed is:

1. An apparatus for processing filled containers, comprising:

a vessel with a central cavity with a first end and a second end and a top and a bottom;

a trough extending along the bottom of the central cavity;

an axle with a length extending from the first end of the central cavity to the second end of the central cavity;

a reel connected to and extending along the length of the axle wherein the reel has an outer edges, which are parts of the reel displaced furthest from the axle, wherein the outer edges of the reel are able to rotate around the axle within the central cavity;

means connected to the outer edges of the reel and extending along the length of the reel for pushing the containers around the reel as the reel is rotated; and a spiral piece on the inside of the central cavity around the reel; and a linear motion detector mechanically connected to the vessel.

2. The apparatus, as recited in claim 1, wherein the linear motion detector, comprises:

a stationary object;

a measuring rod extending to the stationary object; and means for measuring the movement of the linear motion detector with respect to the measuring rod.

3. The apparatus, as recited in claim 2, wherein the means for measuring movement, comprises:

a linear position transducer;

a lever extending between the measuring rod and the linear position transducer; and means for adjusting the position of the linear position transducer and the lever with respect to the measuring rod.

4. The apparatus, as recited in claim 3, further comprising a control box electrically connected to the linear position transducer.

5. The apparatus, as recited in claim 4, further comprising:

a cycling drain in fluid connection with the vessel;

a fluid pump in fluid connection with the cycling drain, wherein the fluid pump is electrically connected to the control box; and a fluid return in fluid connection between the vessel and the fluid pump.

6. The apparatus, as recited in claim 1, further comprising a control box electrically connected to the linear motion detector.

7. The apparatus, as recited in claim 6, further comprising:

a cycling drain in fluid connection with the vessel;

a fluid pump in fluid connection with the cycling drain, wherein the fluid pump is electrically connected to the control box; and a fluid return in fluid connection between the vessel and the fluid pump.

* * * * *